Feb. 9, 1971 J. CAPOZZI ET AL Re. 27,053

SCAFFOLD HOLDER

Original Filed June 20, 1966

INVENTOR.

Joseph Capozzi
Antonio Gatta

United States Patent Office

Re. 27,053
Reissued Feb. 9, 1971

27,053
SCAFFOLD HOLDER

Joseph Capozzi, 129 Montvale Road, and Antonio Gatta, 12 Poole St., both of Woburn, Mass. 01801

Original No. 3,372,771, dated Mar. 12, 1968, Ser. No. 558,856, June 20, 1966. Application for reissue May 5, 1969, Ser. No. 835,854
Int. Cl. E04g *3/00*
U.S. Cl. 182—87 13 Claims

Matter enclosed in heavy brackets [ ] appears in the original patent but forms no part of this reissue specification; matter printed in italics indicates the additions made by reissue.

ABSTRACT OF THE DISCLOSURE

A scaffold holder comprising a cylindrical housing having a threaded hollow opening therein, an adjustable support having a threaded portion on one end thereof and being adapted to longitudinally travel within the housing, means on the other end of the housing for securing the housing to a column of a scaffold, a holder insert adapted to be mounted in the wall of a structure and provided with means for attaching same to the adjustable threaded support member.

Figure 1:
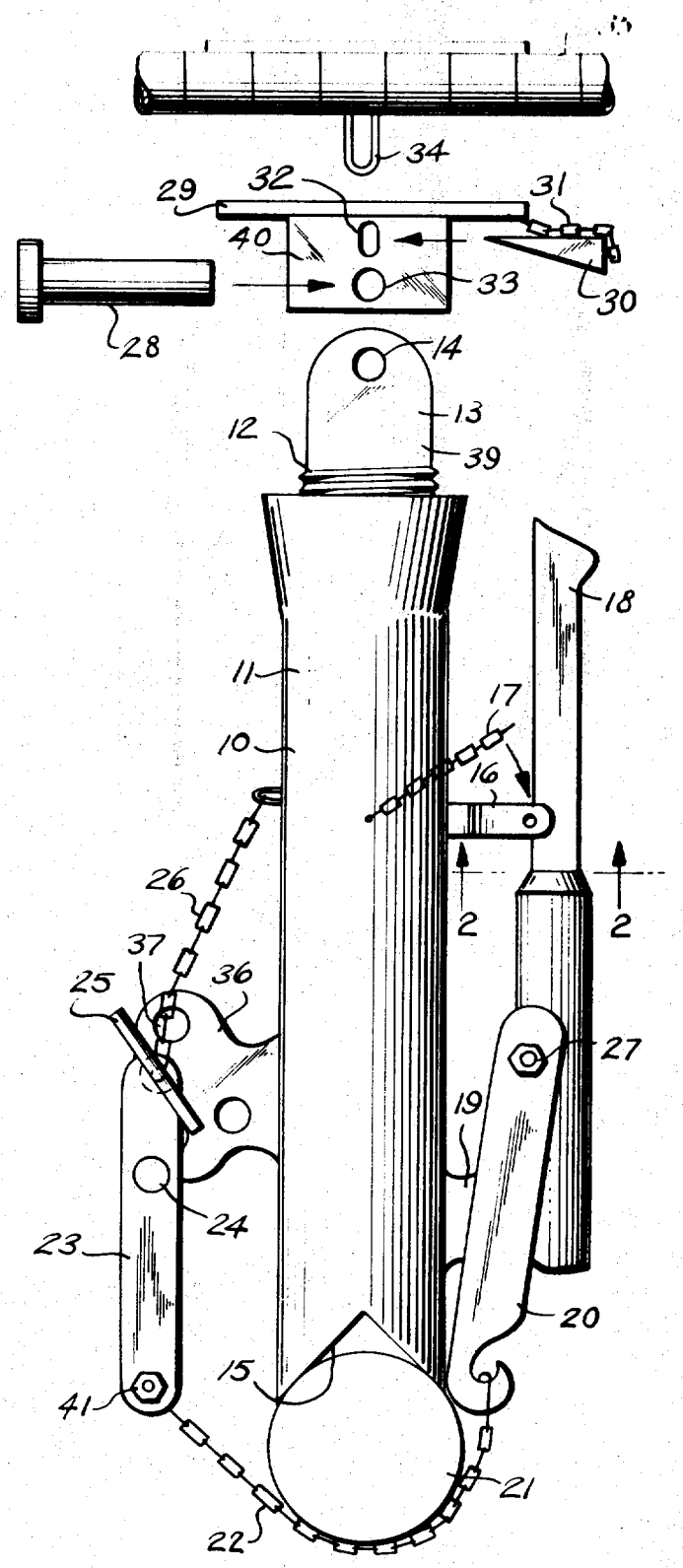

This invention relates to securing devices for scaffolds, and more particularly to a scaffold holder used in the construction industry.

It is therefore the main purpose of this invention to provide a scaffold holder which adjustably secures scaffold in place and provides maximum safety to its user.

Another object of this invention is to provide a scaffold holder, one part of which is secured to the wall and the other part is firmly attached to a column of the scaffold thereby providing increased safety factor without having to employ a human to hold said scaffold.

Another object of this invention is to provide a scaffold holder which can be easily attached or removed from the scaffold.

A still further object of this invention is to provide a scaffold holder which is easy to manufacture and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 2:
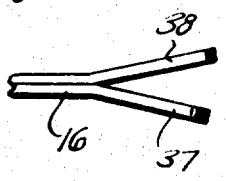

In the drawing:

FIGURE 1 is a side elevational view of this invention shown partially exploded; and FIGURE 2 is a view taken along lines 2—2 of FIGURE 1, and viewed in the direction indicated by the arrows.

According to this invention, scaffold holder 10 is provided with a substantially cylindrical housing 11 having a cylindrical hollow portion therein which is threaded and is arranged to admit threaded portion 12 of adjustable screw 39, one end of which is in a flattened form 13. Hole 14 is provided near the end portion of flattened form 13 thereby forming an insert portion for adjustable screw 39. The other end of cylindrical housing 11 is provided with jaws 15 adapted to enclose and secure housing 11 to a column 21 of a scaffold. One side of housing 11 is provided with handle stop means 16 and handle pivot support 19, both of which extend outwardly from said housing and are in perpendicular relationship thereto. Handle 18 is pivotally secured to handle support 19 which is provided with a pivot pin in its outer end. Hook 20 is pivotally attached to handle 18 by means of pivot pin 27. Chain 22 engages hook 20, as handle 18 pivots about pivot support 19 toward handle stop means 16 the chain is drawn tightly about column 21. The other end of chain 22 is removably secured to the bolt and nut arrangement 41 of chain adjustment panel 23. Cylindrical housing 11 is also provided with adjustment support 36 secured to housing 11 and positioned on the side opposite of hook support 19 and handle support 16 of housing 11. Support 36 is provided with a plurality of holes 37 adapted to admit adjustment pin 25 for securing chain adjustment panel 23 within support 36. In order to render additional flexibility, which is necessary due to varying diameters of column 21, holes 24 of chain adjustment panel 23 and holes 37 of support 36 make it possible for accommodating columns having different diameters and sectional configurations. Adjustment pin 25 is provided with a handle which in turn is secured to chain 26 extending from cylindrical housing 11.

Wedge holder 29 is provided with an outwardly extending panel 40 which includes hole 33 of substantially similar diameter as hole 14 of adjustment screw 39. Bolt 28 is inserted into holes 33 and 14 for securing housing 11 and adjustment screw 39 to wedge holder 29. [Slot 32 is provided within plate 40 and is adapted to admit] *A horizontal slot is provided in wedge holder 29 just above panel 40 which is adapted to admit a U-shaped* hook 34 [of] *attached to* holder insert 35 which is, *in turn,* mounted into the wall of a building. [For added security,] *A* wedge 30 is [inserted into slot 32 and hook 34 of holder insert 35 thus] *inserted down through hook 34 as well as through a registering slot 32 on panel 40 to secure holder 29 to the building, thus* providing direct communication between the wall of a building and column 21 of a scaffold. Wedge 30 is attached to wedge holder 29 by means of chain 31.

What we now claim is:

1. Scaffold holder comprising cylindrical housing having a threaded, hollow opening therein, an adjustable support having a threaded portion on one end thereof and being adapted to longitudinally travel within said housing, the other end of said housing being provided with jaws for grasping and securing said housing to a column of the scaffold, handle and hook means secured to one side of said housing adjustable and pivotable chain support means attached to the other side, flexible chain secured to said chain support means and being adapted to be releasably attached to said hook means, a wedge holder having an outwardly extended panel provided with a hole and a slot therein, a bolt for securing said wedge holder to said adjustable support by positioning said bolt through said holes of said holder and said support, a holder insert adapted to be mounted into the walls of a structure and having receiver means therein adapted to be aligned with said slot of said wedge holder, a wedge member adapted to be inserted through said receiver means and said slot thereby securing said scaffold to the wall by means of said wedge member, said adjustable support and said cylindrical housing, and said chain support means adapted to vary the length of said main chain for securing scaffold columns of various diameters and shapes to said jaws of said cylindrical housing.

2. Scaffold holder according to claim 1, wherein said handle and hook means include a pair of metallic supports extending outwardly from the wall of said cylindrical housing, an elongated adjustable handle secured to one of said supports, a hook having chain receiver means therein adjustably secured to another one of said supports, said hook being pivotably secured to said adjustable handle, said handle adapted to regulate longitudinal ıovements of said hook for varying the working distance f said flexible chain.

3. Scaffold holder according to claim 1, wherein said hain support means include a support plate having a lurality of holes therein, an edge of said plate secured ɔ the wall of said cylindrical housing in a perpendicular elationship thereto and being positioned on the opposite ide of said housing from said handle and hook supɔrt means, a chain adjustment panel having a plurality f holes therein, an adjustment pin flexibly secured to he wall of said housing, said pin adapted to secure one nd of said adjustment panel with said support plate hrough said holes of said adjustment panel and said upport plate, the other end of said adjustment panel beng secured to said flexible chain for removably enclosing aid column of said scaffold.

4. Scafford holder according to claim 1 wherein said djustable support being provided with a flattened porion thereof having a hole therein for admitting the bolt f said wedge holder for securing said adjustable support ɔ said wedge holder and said adjustable support being apable of varying the length of said scaffold holder by nanually rotating said support within the threaded porion of said cylindrical housing.

*5. A scaffold holder comprising a rigid, extensible strut; n abutment at one end of the strut for engaging a scaffold nember; an elongated, flexible member having one end nchored to the strut and being arranged to extend around he scaffold member engaging the abutment; tensioning neans affixed to the strut, said tensioning means comprisng a lever hinged to the strut and carrying means for enaging the flexible member and being arranged to pull he flexible member taut when the lever is swung into osition alongside the strut so that the scaffold member s held firmly against the abutment and means for conecting the other end of the strut to a structure so that the caffold member is securely positioned a determined disance from the structure.*

*6. A scaffold holder as defined in claim 5 and further ncluding means for adjusting the effective length of the lexible member so as to enable the holder to hold scaffold nembers of different sizes.*

*7. A scaffold holder as defined in claim 6 wherein the djusting means comprises means for moving the anchorng point of the flexible member to the strut toward and way from the abutment.*

*8. A scaffold support as defined in claim 5 and further ncluding means for locking the lever in its position alongide the strut so that the flexible member cannot accientally become untensioned.*

*9. A scaffold ladder as defined in claim 5 wherein the onnecting means comprises means for engaging the structure and means for pivotally linking the other end of the trut to the engaging means.*

*10. A scaffold holder as defined in claim 9 wherein he engaging means comprises a relatively large area surace arranged to lie flat against the structure.*

*11. A scaffold holder comprising a rigid, extensible trut; an abutment at one end of the strut for engaging a caffold member; an elongated flexible member having one end anchored to the strut and being arranged to extend around the scaffold member engaging the abutment; a lever hinged to the strut and carrying means for engaging the flexible member and being arranged to pull on the flexible member when the lever is swung into position alongside the strut and thereby pull the flexible member taut so that the scaffold member is held firmly against the abutment; means for adjusting the effective length of the flexible member to enable the holder to hold scaffold members of different sizes; means for locking the lever in its position alongside the strut so that the flexible member cannot accidentally become released; means for engaging the structure and means for pivotally linking the other end of the strut to the engaging means.*

*12. A scaffold holder as defined in claim 11 wherein the engaging means comprises a relatively large area slotted plate arranged to lie flat against the structure; an eye for anchoring to the structure and extending through a slot in the plate and means for insertion through the portion of the eye projecting through the plate so as to removably secure the plate to the structure and thereby firmly position the scaffold member a determined distance from the structure.*

*13. A scaffold holder comprising a rigid, extensible strut; an abutment at the end of the strut for engaging a scaffold member; an elongated, flexible member having one end anchored to the strut and being arranged to extend around the scaffold member engaging the abutment; tensioning means affixed to the strut, said tensioning means being arranged to attach to the flexible member and pull it taut so that the scaffold member is held firmly against the abutment and means for connecting the other end of the strut to a structure so that the scaffold member is securely positioned a determined distance from the structure, said connecting means including a relatively large area surface arranged to lie flat against the structure; means for pivotally linking the other end of the strut to the surface, said surface being provided with a slot; an eye for anchoring to the structure and extending through the slot, and means for insertion through the portion of the eye projecting through the slot so as to removably secure the plate to the structure.*

References Cited

The following references, cited by the Examiner, are of record in the patented file of this patent or the original patent.

UNITED STATES PATENTS

| | | | |
|---|---|---|---|
| 529,745 | 11/1894 | McIntyre | 182—87 |
| 862,498 | 8/1907 | Mohan | 182—87 |
| 2,854,291 | 9/1958 | Riblet | 182—87 |

FOREIGN PATENTS

| | | | |
|---|---|---|---|
| 808,643 | 7/1951 | Germany | 182—87 |

ROY D. FRAZIER, Primary Examiner

J. F. FOSS, Assistant Examiner

U.S. Cl. X.R.

248—354